(12) United States Patent
Kim et al.

(10) Patent No.: US 11,983,160 B2
(45) Date of Patent: May 14, 2024

(54) APPARATUS AND METHOD FOR PROVIDING SENSOR DATA BASED ON BLOCKCHAIN

(71) Applicant: Electronics and Telecommunications Research Institute, Daejeon (KR)

(72) Inventors: Young-Ho Kim, Daejeon (KR); Kyeong-Tae Kim, Daejeon (KR); Jeong-Nyeo Kim, Daejeon (KR); Seon-Gyoung Sohn, Daejeon (KR); Yun-Kyung Lee, Daejeon (KR); Jae-Deok Lim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 17/229,423

(22) Filed: Apr. 13, 2021

(65) Prior Publication Data

US 2021/0365434 A1 Nov. 25, 2021

(30) Foreign Application Priority Data

May 25, 2020 (KR) .......................... 10-2020-0062259

(51) Int. Cl.
*H04L 12/70* (2013.01)
*G06F 16/23* (2019.01)
*H04L 9/06* (2006.01)
*H04L 67/12* (2022.01)

(52) U.S. Cl.
CPC ........ *G06F 16/2365* (2019.01); *H04L 9/0637* (2013.01); *H04L 67/12* (2013.01)

(58) Field of Classification Search
CPC ...... G06F 16/2365; G06F 21/62; G06F 21/64; H04L 9/0637; H04L 67/12; H04L 9/3247; H04L 2209/805; H04L 9/3239; H04L 9/3297; H04L 9/50; H04L 9/3236; H04W 12/10; H04W 12/61; H04W 12/009
USPC ......................................................... 713/161
See application file for complete search history.

(56) References Cited

U.S. PATENT DOCUMENTS

| 9,634,825 B2 | 4/2017 | Shimizu et al. |
| 10,965,690 B2 | 3/2021 | Phan |
| 2018/0139056 A1* | 5/2018 | Imai .................. H04L 9/3247 |
| 2019/0012249 A1* | 1/2019 | Mercuri ................ G06F 9/542 |

(Continued)

FOREIGN PATENT DOCUMENTS

| JP | 5842930 B2 | 1/2016 |
| KR | 101778768 B1 | 9/2017 |

(Continued)

*Primary Examiner* — Ario Etienne
*Assistant Examiner* — Elizabeth Kassa
(74) *Attorney, Agent, or Firm* — William Park & Associates Ltd.

(57) ABSTRACT

Disclosed herein are an apparatus and method for providing sensor data in a sensor device based on a blockchain. A method for providing sensor data in a sensor device based on a blockchain may include creating a device record using encrypted device identification information, registering the device record in the blockchain, creating an event record using event information collected from a sensor, registering the header of the event record, including information about a link to the device record, in the blockchain, and distributing the body of the event record, the body being linked to the header of the event record.

20 Claims, 11 Drawing Sheets

(56) References Cited

U.S. PATENT DOCUMENTS

| | | | |
|---|---|---|---|
| 2019/0013933 A1* | 1/2019 | Mercuri | G06F 16/904 |
| 2019/0013934 A1* | 1/2019 | Mercuri | G06N 20/00 |
| 2019/0013948 A1* | 1/2019 | Mercuri | G06F 16/27 |
| 2019/0349190 A1 | 11/2019 | Smith et al. | |
| 2020/0019936 A1* | 1/2020 | Irazabal | G06Q 20/3827 |
| 2020/0050786 A1* | 2/2020 | Wang | G06Q 20/389 |
| 2020/0127812 A1* | 4/2020 | Schuler | H04L 9/3239 |
| 2020/0160334 A1* | 5/2020 | Alba | H04L 9/0637 |
| 2020/0186332 A1* | 6/2020 | Moeller | H04L 9/30 |
| 2020/0186524 A1* | 6/2020 | Zhou | H04W 4/70 |
| 2020/0250295 A1* | 8/2020 | Padmanabhan | G06F 21/64 |
| 2020/0387896 A1* | 12/2020 | Tran | H04L 9/3247 |
| 2020/0394916 A1* | 12/2020 | Salles | G08G 1/0133 |
| 2021/0182423 A1* | 6/2021 | Padmanabhan | G06F 21/6245 |
| 2021/0256070 A1* | 8/2021 | Tran | G06F 16/90332 |
| 2022/0165384 A1* | 5/2022 | Jibaja | G16H 10/60 |
| 2022/0278830 A1* | 9/2022 | Bunshaw | G06Q 20/3829 |

FOREIGN PATENT DOCUMENTS

| | | |
|---|---|---|
| KR | 1020190002613 A | 1/2019 |
| KR | 1020190035019 A | 4/2019 |
| KR | 1020200003306 A | 1/2020 |
| KR | 1020200048440 A | 5/2020 |

\* cited by examiner

APPARATUS AND METHOD FOR PROVIDING SENSOR DATA BASED ON BLOCKCHAIN

CROSS REFERENCE TO RELATED APPLICATION

This application claims the benefit of Korean Patent Application No. 10-2020-0062259, filed May 25, 2020, which is hereby incorporated by reference in its entirety into this application.

BACKGROUND OF THE INVENTION

1. Technical Field

The disclosed embodiment relates to security technology required for collection of data from IoT sensors and distribution thereof.

2. Description of the Related Art

IoT platform technology is essential in order to arrange the large amount of data required for applying information collected from a large number of sensor devices connected over a network to IoT applications or for optimizing learning and business.

In an IoT platform, a client, which requests data, collects sensor information in the state of being directly connected with a sensor device, which functions as a server, or the client receives previously collected sensor information relayed by a cloud server. In such a server-based data collection and distribution structure, the trustworthiness of data, such as the provenance of data, the ownership thereof, the integrity thereof, and time information pertaining thereto, is based on the reliability of the server that provides the data, rather than on the reliability of the data itself.

In an existing IoT data collection and distribution environment based on the cloud, a server-based data trust model is used. Accordingly, the trustworthiness of information, including the provenance of collected data, the ownership thereof, the integrity thereof, and time information pertaining thereto, is dependent on the reliability of the cloud server that collects and distributes the data, rather than on an IoT sensor device.

Therefore, technology for protecting data in an IoT data collection environment tends to put emphasis on authentication, approval, access control, and channel protection, performed when a server and a client, which is the consumer of data, communicate with each other. However, when big-data analysis or machine learning is performed, because a large amount of data is acquired through various distribution routes and because the data is used a long time after being collected from individual sensors, it is very difficult to consistently verify the reliability of the data itself.

Meanwhile, when IoT sensor information is accumulated as large-scale data and used for machine learning or big-data analysis in the conventional art, a standardized data structure in the form of a stream including time information is used. Here, when sensor information from which time information is missing is used for training or analysis or when erroneous time information arising from malfunction of the timer of a sensor device is used for training or analysis without being corrected, data distortion causing an erroneous analysis result may be caused. Further, at the data consumption stage, rather than the time at which information is collected from a sensor device, it is very difficult to infer past time information.

Finally, technology for collecting and distributing IoT sensor information is very important for value creation, because data is regarded as an asset. Particularly, when different and complex data distribution routes are present, the sensor device that creates data, the cloud server that owns the data, and the server that distributes the data are different from each other, and thus a dispute over the ownership of original data may occur when the data is traded.

DOCUMENTS OF RELATED ART (Patent Document 1) Korean Patent Application Publication No. 10-2019-0035019.

SUMMARY OF THE INVENTION

An object of the embodiment is to enable the reliability of the provenance of data, the ownership thereof, the integrity thereof, and time information pertaining thereto to be verified using the data itself based on a blockchain, regardless of the server for providing IoT sensor data or the distribution route of the data.

Another object of the embodiment is to correct time information when pieces of sensor information in the nature of individual events are reproduced as stream data after being collected, thereby enabling accurate analysis.

A further object of the embodiment is to include device ownership information and device internal information in all of the data to be created, thereby enabling the data to be verified using the data itself, regardless of the distribution route thereof.

A method for providing stream data in a sensor device based on a blockchain according to an embodiment may include creating a device record using encrypted device identification information; registering the device record in the blockchain; creating an event record using event information collected from a sensor; registering the header of the event record, including information about a link to the device record, in the blockchain; and distributing the body of the event record, the body being linked to the header of the event record.

Here, the device record may include a device public key, a device identifier, and a record signature.

Here, the header of the event record may include a sequence number, which indicates an event occurrence sequence, a previous record link in which the hash value of the device record or the hash value of the header of the previous event record is recorded, and a record body link in which the hash value of the body of the event record is recorded.

Here, the body of the event record may include a measurement value collected from the sensor and a timestamp indicating an internal timer time at the moment when the measurement value is inserted into the body of the event record.

Here, the device record may further include an owner public key acquired from an owner server.

Here, with regard to the device record registered in the blockchain, owner information and the device identifier may be verified by way of the owner server.

Here, distributing the body of the event record may be configured to register the body of the event record in an owner server, the owner server may transmit the body to a stream data consumer terminal based on authentication of a consumer in response to a request for the body of the event record from the stream data consumer terminal, and the stream data consumer terminal may verify the body of the event record by acquiring the header of the event record, corresponding to the body of the event record, from the blockchain.

Here, distributing the body of the event record may be configured to register the body of the event record in a distributed data repository, the distributed data repository may provide the body of the event record in response to a request from a stream data consumer terminal, and the stream data consumer terminal may verify the body of the event record by acquiring the header of the event record, corresponding to the body of the event record, from the blockchain.

A method for adjusting an event time in a stream data consumer terminal according to an embodiment may include acquiring a timestamp recorded in a verified event record body and a transaction time at which the event record header is registered in a blockchain; and setting an adjusted event time based on the acquired timestamp and transaction time.

Here, setting the adjusted event time may include calculating the time difference between a time recorded in the timestamp and the transaction time; and setting one of the time recorded in the timestamp and the transaction time as the adjusted event time depending on whether the calculated time difference is less than a tolerance.

Here, setting the adjusted event time may be configured to set the transaction time as the adjusted event time when there is no timestamp in the event record body.

Here, setting the adjusted event time may include setting an event record reference time based on at least one of the timestamp included in the event record body and the transaction time of the previous event record body when two or more events are recorded in the event record body; and setting the time of each of the events by interpolating the time difference between the set event record reference time and the transaction time of the event record body based on the number of two or more events.

A sensor device according to an embodiment may include memory in which at least one program is recorded and a processor for executing the program. The program may perform creating a device record using encrypted device identification information, registering the device record in a blockchain, creating an event record using event information collected from a sensor, registering the header of the event record, including information about a link to the device record, in the blockchain, and distributing the body of the event record, the body being linked to the header of the event record.

Here, the device record may include a device public key, a device identifier, and a record signature.

Here, the header of the event record may include a sequence number, which indicates an event occurrence sequence, a previous record link in which the hash value of the device record or the hash value of the header of the previous event record is recorded, and a record body link in which the hash value of the body of the event record is recorded.

Here, the body of the event record may include a measurement value collected from the sensor and a timestamp indicating an internal timer time at the moment when the measurement value is inserted into the body of the event record.

Here, the device record may further include an owner public key acquired from an owner server.

Here, distributing the body of the event record may be configured to register the body of the event record in an owner server, the owner server may transmit the body to a stream data consumer terminal based on authentication of a consumer in response to a request for the body of the event record from the stream data consumer terminal, and the stream data consumer terminal may verify the body of the event record by acquiring the header of the event record, corresponding to the body of the event record, from the blockchain.

Here, distributing the body of the event record may be configured to register the body of the event record in a distributed data repository, the distributed data repository may provide the body of the event record in response to a request from a stream data consumer terminal, and the stream data consumer terminal may verify the body of the event record by acquiring the header of the event record, corresponding to the body of the event record, from the blockchain.

Here, the stream data consumer terminal may acquire a timestamp recorded in the verified body of the event record and a transaction time at which the header of the event record is registered in the blockchain, and may set an adjusted event time based on the acquired timestamp and transaction time.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
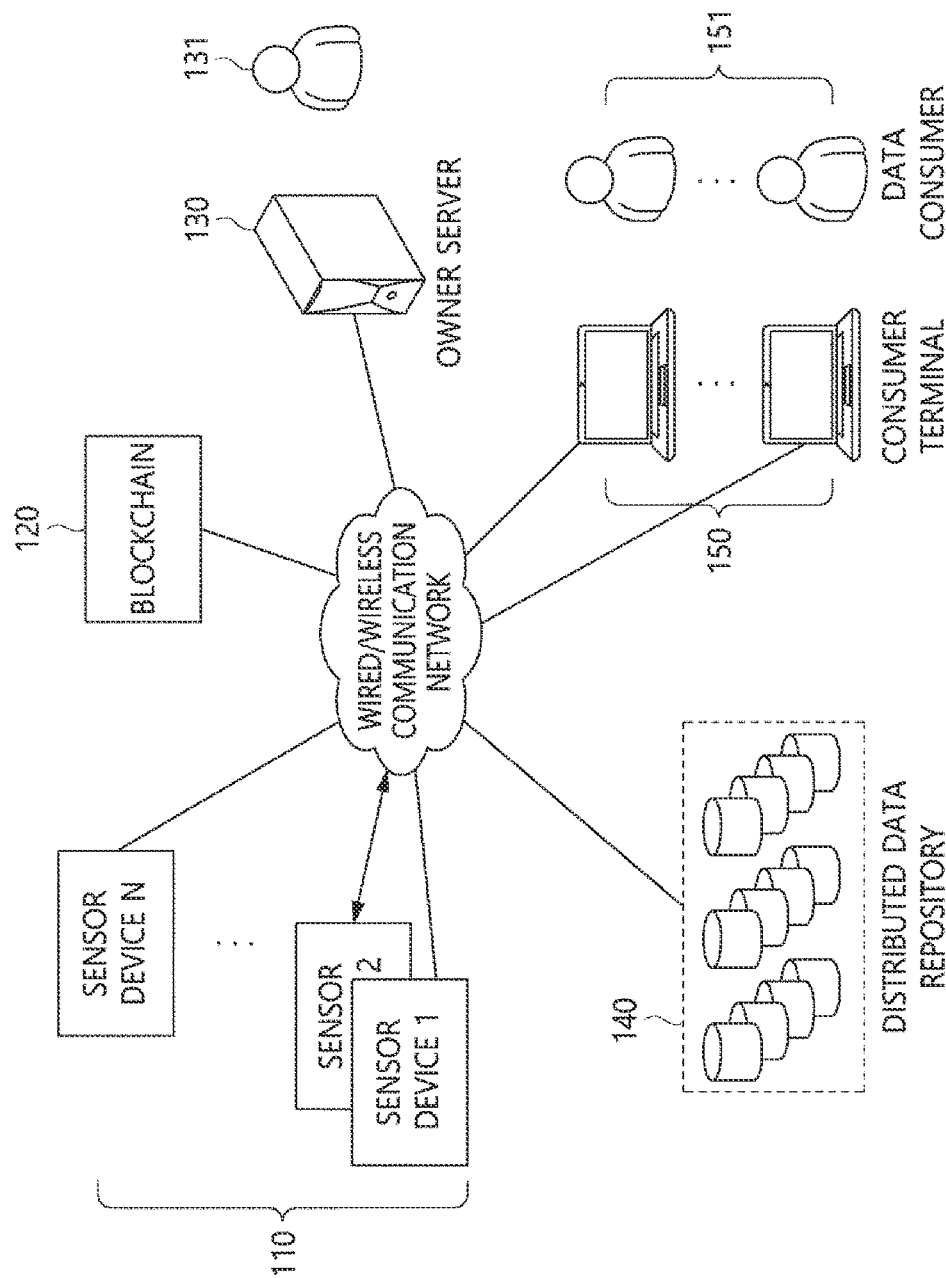
FIG. 1 is a schematic block diagram of a system for providing sensor data based on a blockchain according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for providing sensor data based on a blockchain according to an embodiment will be described in detail with reference to FIGS. 1 to 13.

Figure 2:
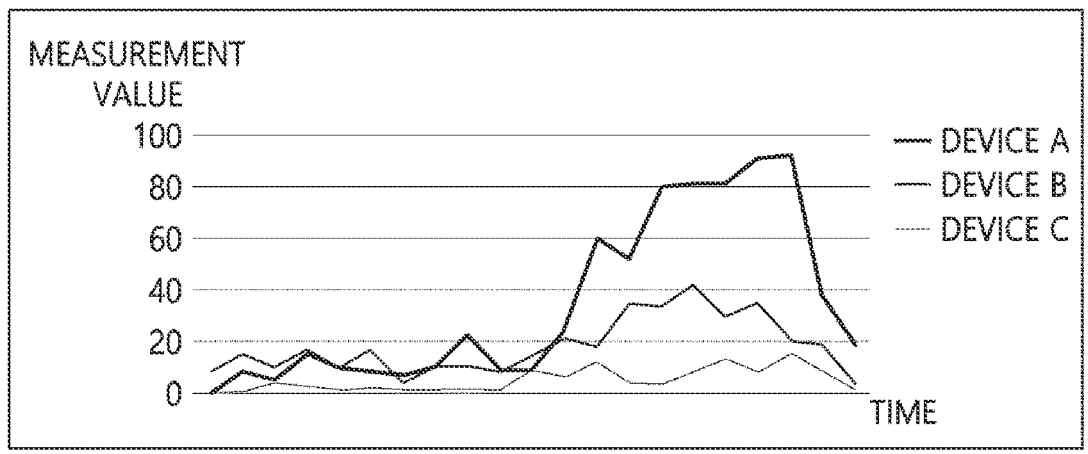
FIG. 2 is an exemplary view illustrating stream data generated from sensor data.

FIG. 1 is a schematic block diagram of a system for providing sensor data based on a blockchain according to an embodiment, and FIG. 2 is an exemplary view illustrating stream data generated from sensor data.

Referring to FIG. 1, the system for providing sensor data based on a blockchain may be configured such that a sensor device 110, a blockchain 120, an owner server 130, a distributed data repository 140, and a consumer terminal 150 operate in conjunction with each other through a wired/wireless communication network.

Here, the wired/wireless communication network may include all of wireless Internet communication, such as Wi-Fi, WiBro, and the like, mobile communication, such as WCDMA, LTE, and the like, Wireless Access in Vehicular Environment (WAVE) wireless communication, cable Internet communication, and the like.

The sensor device 110 creates deployable data from surrounding environment states measured by at least one sensor (not illustrated) distributed in an Internet-of-Things (IoT) environment. Also, the sensor device 110 may comprise multiple sensor devices.

Here, measurement of the surrounding environment state by a sensor may be referred to as an event, and the measured information may be referred to as event information.

According to an embodiment, in order to verify the provenance, ownership, and integrity of event information using a public-key cryptography algorithm, the sensor device 110 may securely store a device private key in the secure memory thereof. Optionally, the public key of an owner may also be stored therein.

According to an embodiment, the sensor device 110 creates event information in a data format of a self-verifiable record based on the blockchain 120, thereby enabling the consumer terminal 150 to create stream data by collecting the data in units of records and to use the same.

The operation of the sensor device 110 will be described in detail later with reference to FIGS. 3 to 8.

The blockchain 120 is connected with the sensor device 110, and registers data in units of records created by the sensor device 110 therein through a verification process. The blockchain 120 supports data verification such that data in the form of a record is verified based on the data itself in response to a request from the consumer terminal 150. The operation of the blockchain 120 will be described in detail later with reference to FIGS. 3 to 8.

The owner server 130 is a server device operated by an owner 131 who installs the sensor device 110, operates/manages the same, and selectively distributes sensor data based on ownership of the device, and may be any device capable of performing a computing operation and communication over a network. Here, the multiple sensor devices 110 may be possessed by a single owner server 130, or, although not illustrated in the drawing, the multiple sensor devices 110 may be possessed by multiple different respective servers.

According to an embodiment, the owner server 130 provides the public key of the owner to the sensor device 110 and securely stores a private key corresponding to the public key of the owner.

According to an embodiment, the owner server 130 may verify the ownership of the sensor device 110, or may allow only a qualified consumer terminal 150 to access the data in units of records provided from the sensor device 110.

For example, the sensor device 110 possessing a blockchain wallet and the owner server 130 may use Elliptic Curve Cryptography (ECC) public key and private key in the wallet. However, in the present invention, the public-key pair is not limited to the ECC public-key pair.

The distributed data repository 140 may enable the data in units of records provided from the sensor device 110 to be easily accessed by the consumer terminal 150 without an authentication process.

The consumer terminal 150 may be the terminal of an end consumer 151 who requires stream data created by collecting sensor data in units of events distributed by the sensor device 110. The consumer terminal 150 may include a laptop computer, a smartphone, a tablet PC, and the like, and may be understood as including all kinds of data communication terminals capable of transmitting and receiving data over a wired/wireless communication network and a data collection engine implemented on a cloud.

Here, the stream data is a data structure formed of consecutive sets, each of which represents information of a corresponding event collected from a sensor as a pair comprising a time and a measurement value. The stream data is used as basic data for visualization, big-data analysis, and learning. For example, as illustrated in FIG. 2, the stream data may be represented as sensor measurement values, measured over time by the respective sensor devices, using a visualization tool. Therefore, time information of individual events is an important factor for visualization and analysis of the stream data and for determining the accuracy of AI prediction.

According to an embodiment, the consumer terminal 150 may reproduce stream data by correcting the time at which data of each event is created. Time correction performed by the consumer terminal 150 will be described in detail later with reference to FIGS. 9 to 12.

Figure 3:
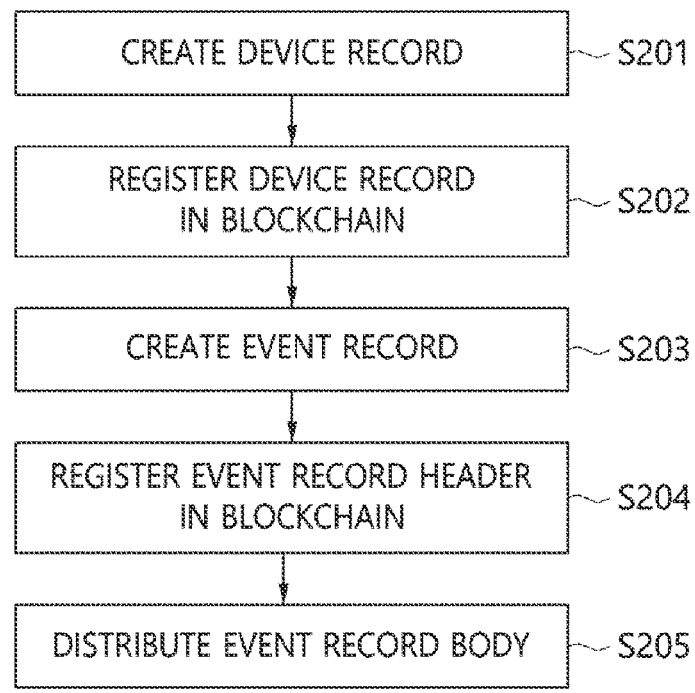
FIG. 3 is a flowchart for explaining a method for providing sensor data in a sensor device based on a blockchain according to an embodiment.

FIG. 3 is a flowchart for explaining a method for providing sensor data in a sensor device based on a blockchain according to an embodiment.

Referring to FIG. 3, the method for providing sensor data based on a blockchain, which is performed in a sensor device 110, may include creating a device record using device identification information at step S201, registering the device record in a blockchain at step S202, creating an event record using event information collected from a sensor at step S203, registering the header of the event record in the blockchain at step S204, and distributing the body of the event record at step S205.

Steps S201 to S202 will be described in detail later with reference to FIG. 6.

Also, steps S203 to S206 will be described in detail later with reference to FIG. 7 and FIG. 8. Here, step S205 may be implemented as two embodiments according to the present invention.

Figure 7:
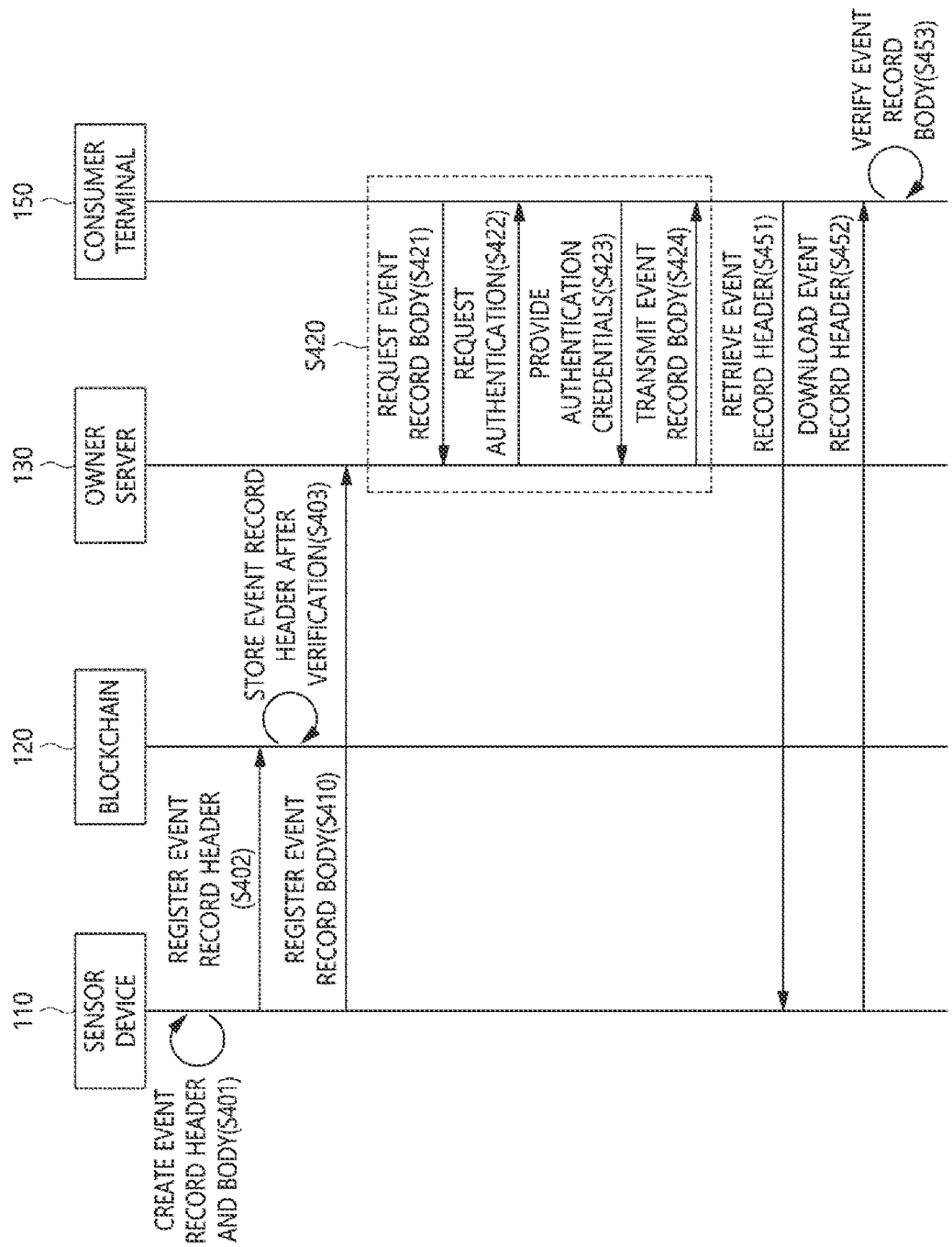
FIG. 7 is a signal flow diagram for explaining the process of creating/registering an event record and distributing the same according to an embodiment.

An embodiment is a transaction model, and only a qualified consumer terminal 150 may be allowed to access data through an owner server 130, as illustrated in FIG. 7.

Figure 8:
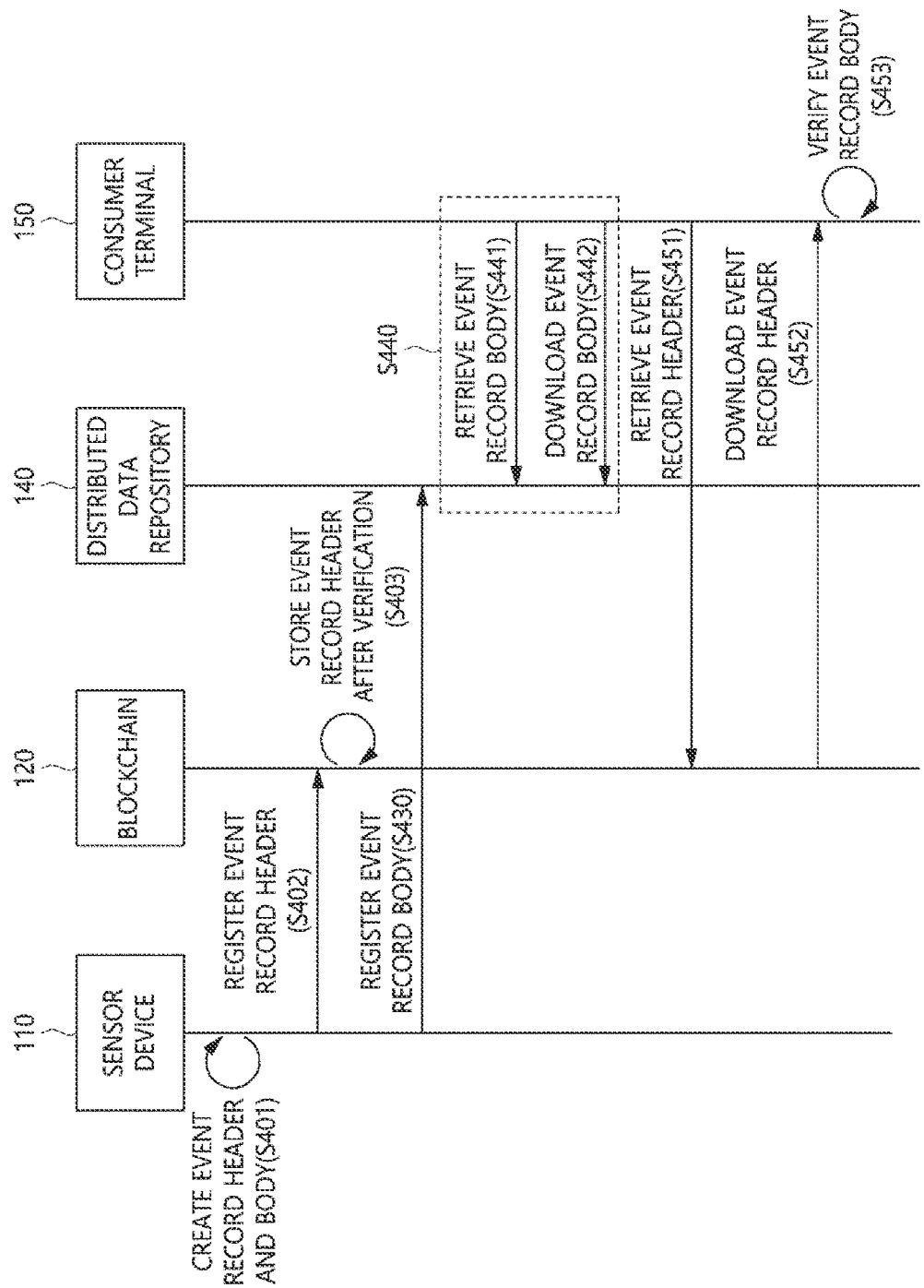
FIG. 8 is a signal flow diagram for explaining the process of creating/registering an event record and distributing the same according to another embodiment.

Another embodiment is a sharing model, and data may be provided to multiple unspecified consumer terminals 150 for free via various distributed data repositories 140, as illustrated in FIG. 8.

Accordingly, as in a cloud environment, data distribution may be exclusively controlled through the owner server of an IoT device, and a data consumer extracts ownership information from data itself and verifies the same without intervention on the part of the owner, thereby autonomously determining whether a data transaction is legitimate. Further, even if data is distributed or shared among unspecified people using distributed data repositories for public purposes, disputes over data ownership may be solved using the data itself.

Figure 4:
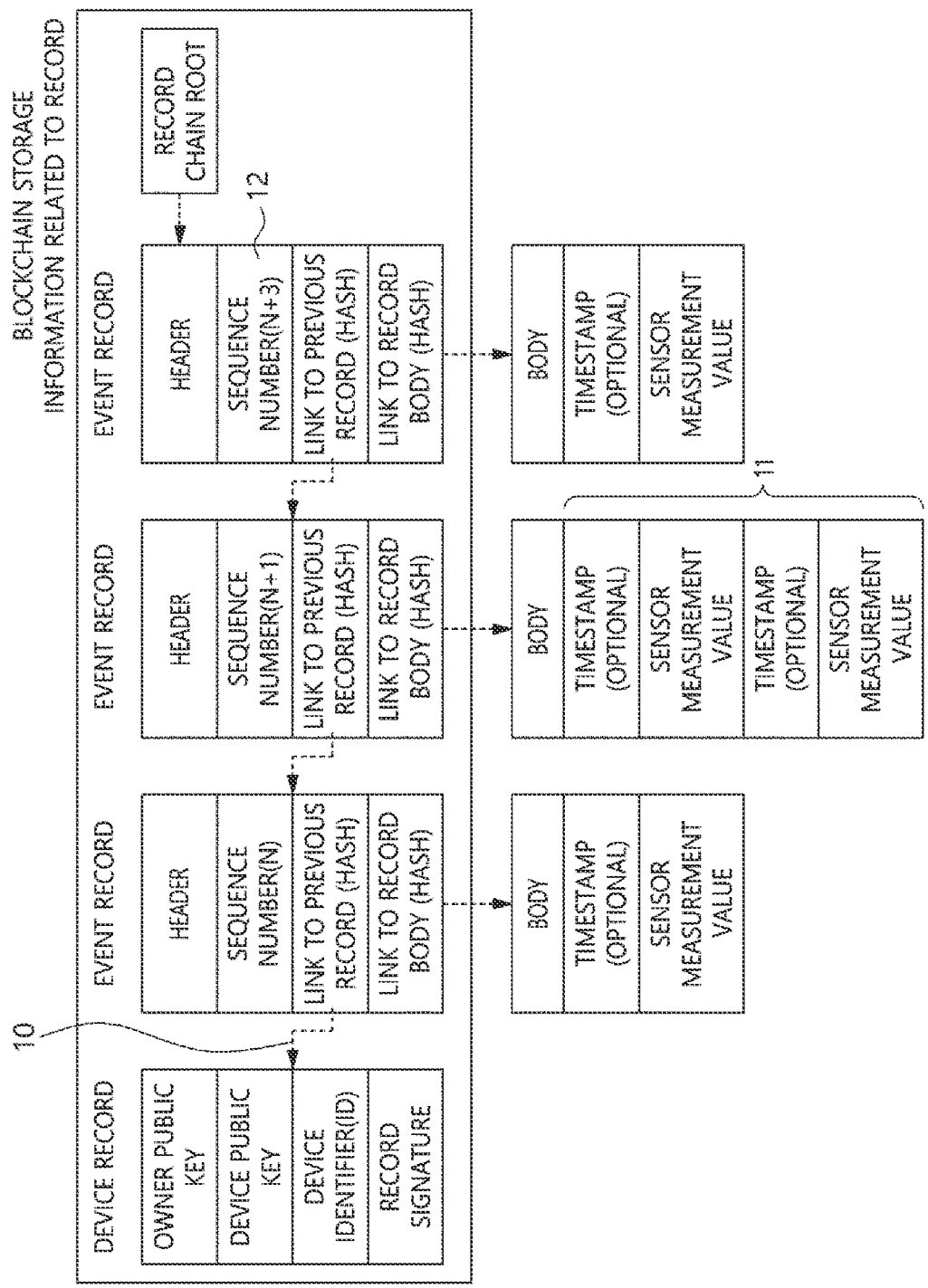
FIG. 4 is an exemplary view illustrating a device record and an event record according to an embodiment.
Figure 5:
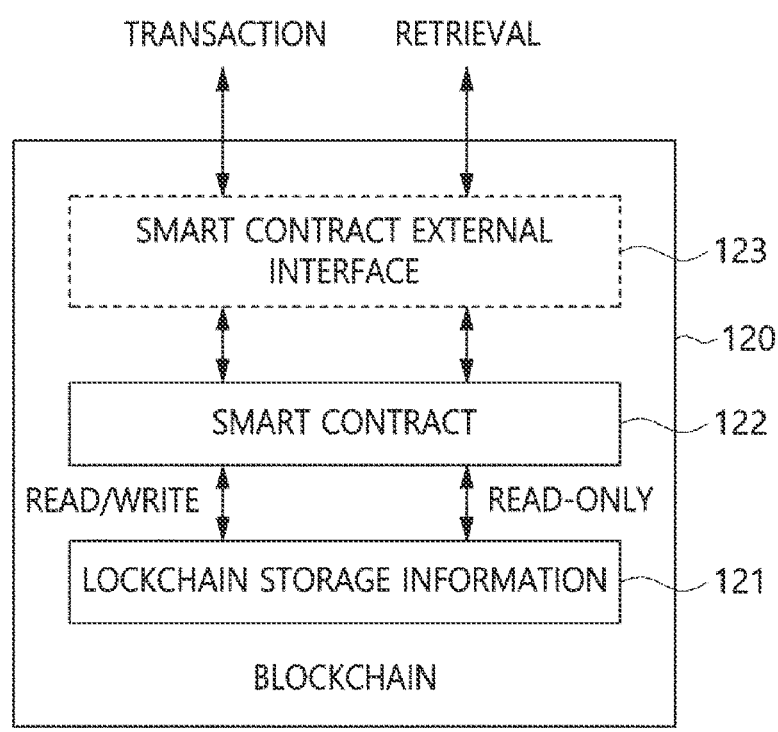
FIG. 5 is a block diagram of a blockchain according to an embodiment.

FIG. 4 is an exemplary view illustrating a device record and an event record according to an embodiment, and FIG. 5 is a block diagram of a blockchain according to an embodiment.

Referring to FIG. 4, a device record may include a device public key, a device identifier, and a record signature. Optionally, the device record may further include an owner public key acquired from an owner server 130.

Here, the device identifier is an ID that is assigned in order to identify devices of respective manufacturers, and may be represented, for example, in any of various forms including that of a UUID.

Here, the record signature may be a value acquired by signing the device public key and the device identifier with a device private key. Alternatively, the record signature may be a value acquired by signing the owner public key, the device public key, and the device identifier with the device private key.

That is, the record signature is a value resulting from application of a cryptographic signature algorithm based on a public key, and for example, when the owner public key or the device public key is an ECC-based public key, an Elliptic Curve Digital Signature Algorithm (ECDSA) may be used.

Here, an event record may be created by producing event information, collected using a sensor, in a record format, and may include a header and a body.

The header of the event record may include a sequence number indicating an event occurrence sequence, a previous record link in which the hash value of the device record or the hash value of the header of the previous event record is recorded, and a record body link in which the hash value of the body of the event record is recorded. Here, the sequence number may be assigned a value increased by '1' from that of a previous event.

Here, the previous record link acts as a pointer that points to the header of the previous event record.

Here, when the sequence number in the header of the event record is '1', the hash value of the device record may be recorded in the previous record link.

Also, according to an embodiment, when the sequence number in the header of the event record is equal to or greater than '2', the hash value of the previous event record may be recorded in the previous record link. For example, over time, whenever a new event record is added, the headers of the event records may be sequentially connected in a hash chain structure.

Also, according to another embodiment, when the sequence number in the header of the event record is equal to or greater than '2', the hash value of the device record may be recorded in the previous record link, unlike what is illustrated in FIG. 4. Accordingly, a problem in which the time spent searching increases with an increase in the sequence number due to an increase in the number of event record headers that are sequentially linked may be solved.

Here, the record body link may act as a pointer that points to the body of the corresponding event record.

Here, the hash values recorded in the previous record link and the record body link are calculated using a cryptographically secure hash algorithm, e.g., SHA-256.

Meanwhile, as record-related information stored in the blockchain 120, a record chain root may be further included.

Here, the record chain root is a pointer that points to the header of the event record that is most recently added, and may be retrieved in order to check the most recent event.

Here, the record chain root is a state variable defined in the blockchain, which is represented as the hash value of the header of the most recent event record, and may be changed using only a transaction for adding the header of a new event record.

Additionally describing this with reference to FIG. 5, the blockchain 120 stores all the information including a smart contract 122 in a distributed manner so as to be shared.

Here, the smart contract 122 in the form of a program defines stored information (a state variable) and implements a service for changing or retrieving the corresponding information in response to input from the outside. Consequently, the smart contract 122 is executed in response to a call from the outside (an external interface) 123.

Among the input from the outside, a transaction is an interface that necessarily includes the signature of a caller and is capable of changing the state variable stored in the blockchain 120 through the smart contract 122. In contrast, a retrieval (call) interface is capable only of reading the stored information (read-only) through the smart contract 122. Accordingly, the record-related information stored in the blockchain, illustrated in FIG. 4, is updated using only a transaction of the corresponding sensor device. Also, in order to refer to information required for verification of an event record, the consumer terminal 150 may read the corresponding information through the retrieval interface, rather than through the transaction.

For example, the record chain root illustrated in FIG. 4 is a state variable defined by the smart contract 122, and acts as a pointer that points to the header of the most recent event record, as described above. Accordingly, when the sensor device 110 causes a transaction for adding a new event record header, the smart contract 122 links the corresponding record header to a chain and updates the value of the record chain root with the hash value of the new record header. Also, the consumer terminal 150 may immediately check the hash value of the updated event record header information by retrieval (call).

In terms of the information 121 stored in the blockchain, the record chain root may also be the information stored in a block in the blockchain, like the device record or the event record header.

Referring again to FIG. 4, the body of the event record may include a measurement value collected from the sensor and a timestamp in which the internal timer time at the moment when the measurement value is inserted into the body of the event record is recorded. For example, when the body of an event record is collected from a temperature sensor, the time at which the temperature is measured and the measured temperature value may be input thereto.

Here, measurement values measured through two or more events may be recorded in the body of the event record. That is, as illustrated in FIG. 4, measurement values 11 measured through two or more events may be recorded in the body of a single record, in which case the sequence number 12 in the header of the next event record may be increased in consideration of the number of events recorded in the body of the current event record. That is, when the sequence number in the header of the current event record is "N+1", the sequence number in the header of the next event record may be set to "N+3", which is an increase of 2.

Here, the body of the event record may include respective timestamps corresponding to the two or more events, or only a single timestamp may be recorded therein, unlike what is illustrated in FIG. 4. For example, only a timestamp for the first sensor measurement value, among the measurement values recorded in the body of the event record, may be recorded, as described below.

However, this is an example for helping understanding of a description, and the present invention is not limited thereto. That is, only a timestamp for a sensor measurement value following the second sensor measurement value may be recorded, timestamps for a predetermined number of sensor measurement values, among values measured through events, may be recorded, or no timestamp may be recorded in the body of the event record.

In this case, the consumer terminal 150, which creates stream data by collecting multiple event records, may correct the time at which each of the events has occurred using a time correction method, such as interpolation or the like.

Figure 6:
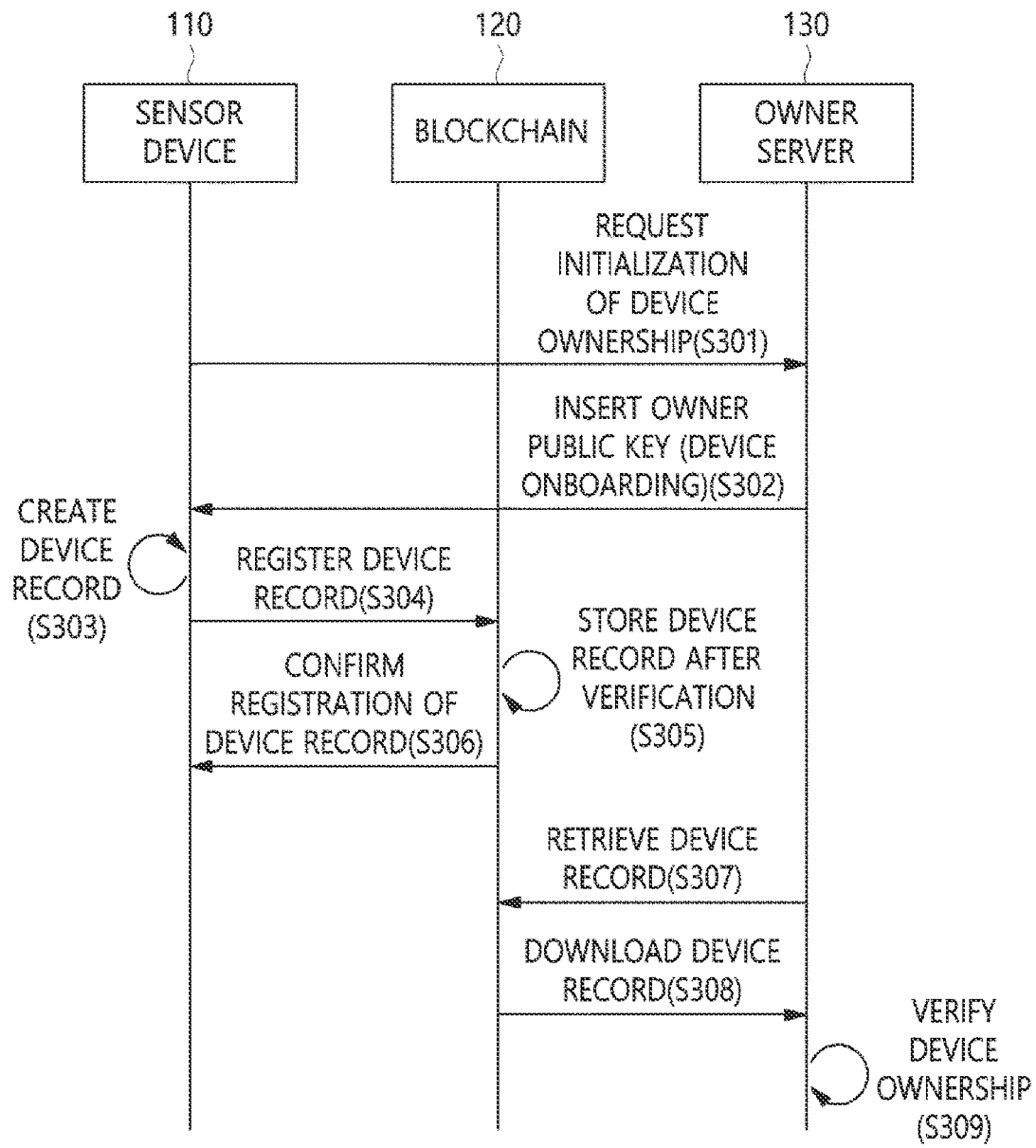
FIG. 6 is a signal flow diagram for explaining the process of creating a device record and registering the same according to an embodiment.

FIG. 6 is a signal flow diagram for explaining the process of creating and registering a device record according to an embodiment.

Referring to FIG. 6, when it first operates, a sensor device 110 requests an owner server 130 to initialize the ownership of the device at step S301. In response thereto, the owner server 130 performs device onboarding and provides an owner public key to the sensor device 110 at step S302. Steps S301 and S302 may be selectively performed.

The sensor device 110 creates a device record based on device identification information at step S303. Here, the device record may include a device public key, a device identifier, and a record signature. Also, depending on whether steps S301 and S302 are performed, the device record may further include the owner public key acquired from the owner server 130.

Then, the sensor device 110 registers the device record in a blockchain 120 through a transaction at step S304. The device record is registered using only a transaction including the signature of a requester.

The blockchain 120 verifies the device record, the registration of which is newly requested, and stores the same at step S305. That is, the blockchain 120 verifies the signature of the transaction using the device public key in the device record, which is included as an argument of the transaction, and newly registers only the device record, the registration of which is requested by the device possessing a device private key.

Then, using an interface of the blockchain 120, the sensor device 110 checks whether the device record is registered at step S306.

Optionally, with regard to the device record registered in the blockchain, the owner information and the device identifier may be verified by way of the owner server 130 at steps S307 to S309.

That is, the owner server 130 retrieves the new device record of the sensor device possessed thereby at step S307 by accessing the blockchain 120, and downloads the device record at step S308. Then, the owner server 130 verifies the owner information and the device identifier included in the device record at step S309.

FIG. 7 is a signal flow diagram for explaining the process of creating/registering an event record and distributing the same according to an embodiment.

Referring to FIG. 7, a sensor device 110 creates an event record using event information collected from a sensor at step S401. Here, the configuration of the created event record is as illustrated in FIG. 4.

The sensor device 110 registers the header of the event record in a blockchain 120 through a transaction at step S402. Accordingly, the blockchain 120 verifies the header of the event record, the registration of which is newly requested, and stores the same at step S403. That is, the blockchain 120 checks whether the creator of the header included in the transaction is the same as the requester of the transaction. Here, only when the creator of the header of the event record is the same as the requestor of the transaction may the header of the event record be successfully registered in the blockchain 120. For example, because all of the transactions of the blockchain 120 include the signature of the requester, a device public key is extracted from a device record at the head of the hash chain, to which the new event record header included in the transaction points, and is used for verifying the signature of the transaction, whereby whether the requester of the transaction is the same as the creator of the record header may be verified.

The sensor device 110 registers the body of the event record in an owner server 130 at step S410. The body of the event record may be distributed under the access control of the owner server 130 at step S420.

Specifically, when a consumer terminal 150 requests the body of the event record from the owner server 130 at step S421, the owner server 130 requests authentication information from the consumer terminal 150 at step S422. Then, when the consumer terminal 150 provides authentication credentials to the owner server 130 at step S423, the owner server 130 may transmit the body of the event record to the consumer terminal at step S424. Here, the owner server 130 may store therein the credentials 112 required for authenticating the specified data consumer, or may use a third-party authentication server using a protocol such as OAuth2.0 or the like, thereby controlling access to the data by the consumer.

The consumer terminal 150, which acquires the body of the event record, acquires the header of the event record corresponding to the body of the event record from the blockchain 120 at steps S451 to S452.

Then, in order to create stream data including time information based on the event information created by the sensor device 110, the consumer terminal 150 itself verifies the provenance, ownership, integrity and time information of the measurement information extracted from the body of the event record using the header of the event record at step S453. That is, the reliability of the provenance, ownership, integrity and time information may be verified based only on the event record itself, regardless of the distribution route.

FIG. 8 is a signal flow diagram for explaining the process of creating/registering an event record and distributing the same according to another embodiment.

A description of steps S401 to S403 and S451 to S453 illustrated in FIG. 8 would be redundant with the description made with reference to FIG. 7, and thus will be omitted.

Referring to FIG. 8, unlike what is illustrated in FIG. 7, the sensor device 110 registers the body of the event record in a distributed data repository 140 at step S430. Then, the body of the event record may be distributed without qualification at step S440.

That is, when the consumer terminal 150 requests the body of the event record from the distributed data repository 140 at step S441, the distributed data repository 140 may immediately transmit the body of the event record to the consumer terminal 150 at step S442.

Meanwhile, depending on whether steps S301 to S302 in FIG. 6 are performed, verification of ownership may be selectively performed at step S453.

Through the above-described embodiment, the reliability of provenance, ownership, integrity, and time information may be verified for each event record, which is the smallest unit of sensor data.

However, it is difficult to guarantee the reliability of the time information because it can be intentionally omitted in the process of creating an event record or because an error may occur due to a failure in the timer in a sensor device. Particularly, because an embodiment is configured such that stream data is reproduced based on the time information of an individual event, the time information is directly related to the accuracy and reliability of the stream data.

Accordingly, an embodiment proposes a method for correcting the time information of an event record, in which a sensor device is totally involved, based on the blockchain transaction time in accordance with external objective criteria.

Figure 9:
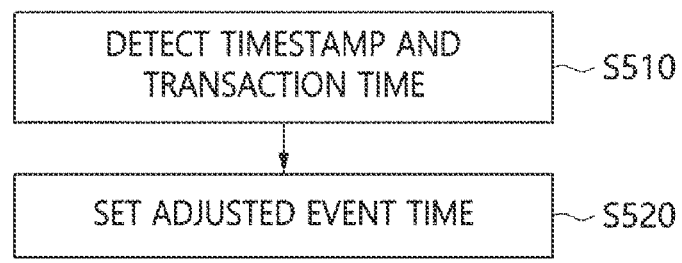
FIG. 9 is a flowchart for explaining a method for correcting an event time in a consumer terminal according to an embodiment.
Figure 10:
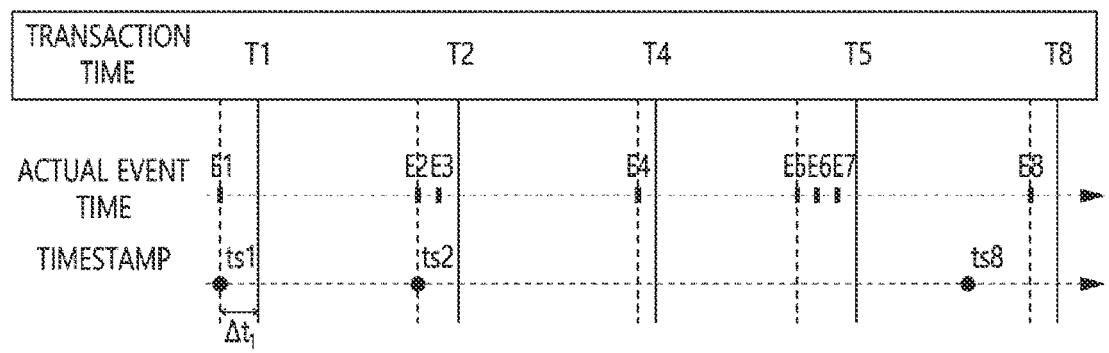
FIG. 10 is a view for explaining various examples of event time correction according to an embodiment.

FIG. 9 is a flowchart for explaining a method for correcting an event creation time in a consumer terminal according to an embodiment, and FIG. 10 is a view for explaining various examples of event time correction according to an embodiment.

Referring to FIG. 9, the method may include acquiring a timestamp recorded in the verified body of an event record and a transaction time, at which the header of the event record is registered in a blockchain, at step S510 and setting an adjusted event time based on the acquired timestamp and transaction time at step S520.

FIG. 10 illustrates the actual time at which an event in which a sensor device measures surrounding environment information, such as temperature or the like, has occurred, a timestamp that is input to the body of an event record by a sensor device when the sensor device creates the event record using the sensor measurement value, and a transaction time at which the header of the event record is registered in a blockchain.

At step S520, when a consumer terminal 150 reproduces stream data by collecting event records, an adjusted event time is set by additionally referring to the transaction time, which is an external time, rather than based only on the timestamp of the timer in the sensor device. That is, step S520 is performed in order to set the adjusted event time so as to be as close as possible to the actual time at which the event occurred even when the timestamp is omitted or an error occurs.

Figure 11:
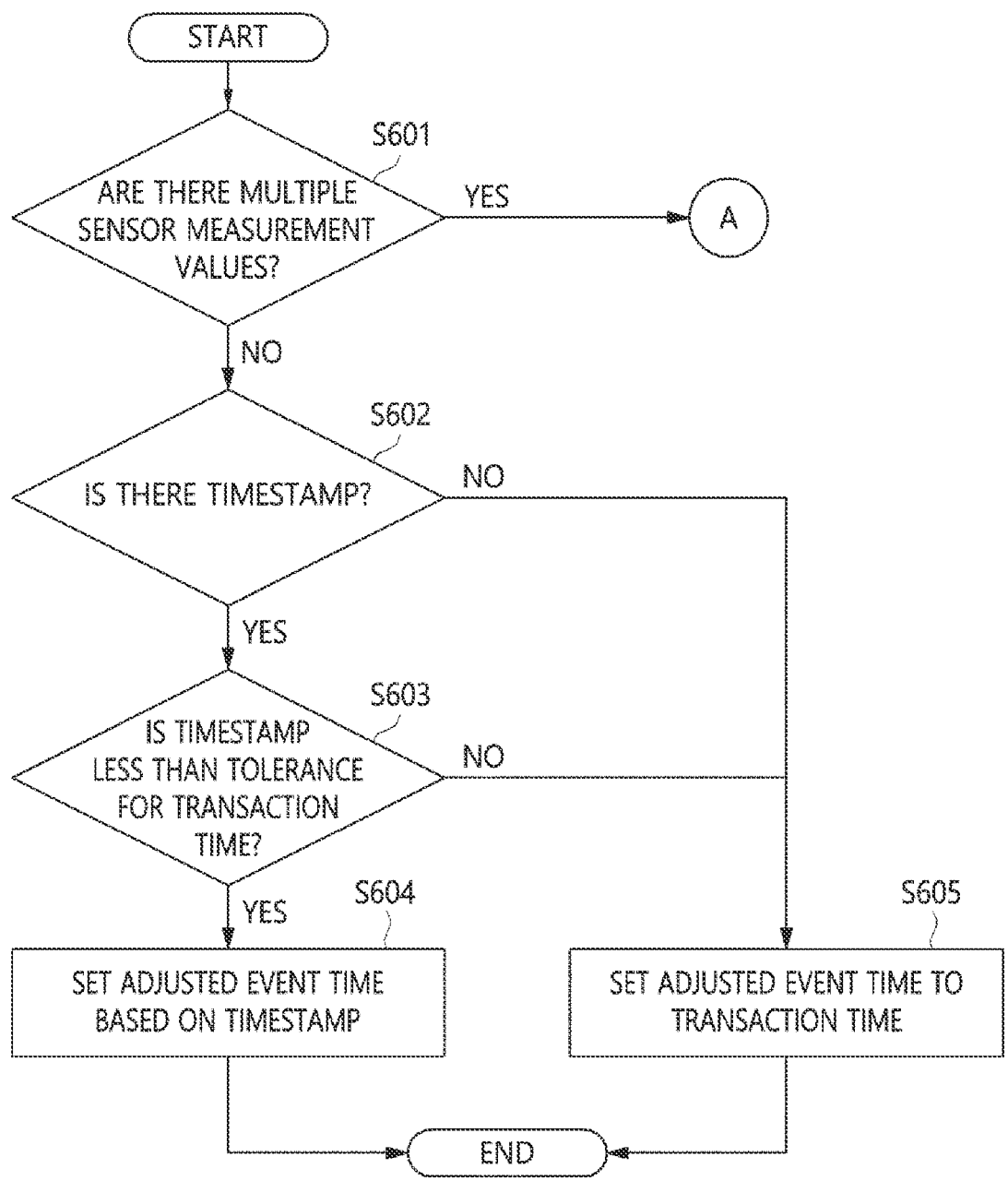
FIG. 11 and FIG. 12 are flowcharts for explaining step S520 illustrated in FIG. 9 in detail.
Figure 12:
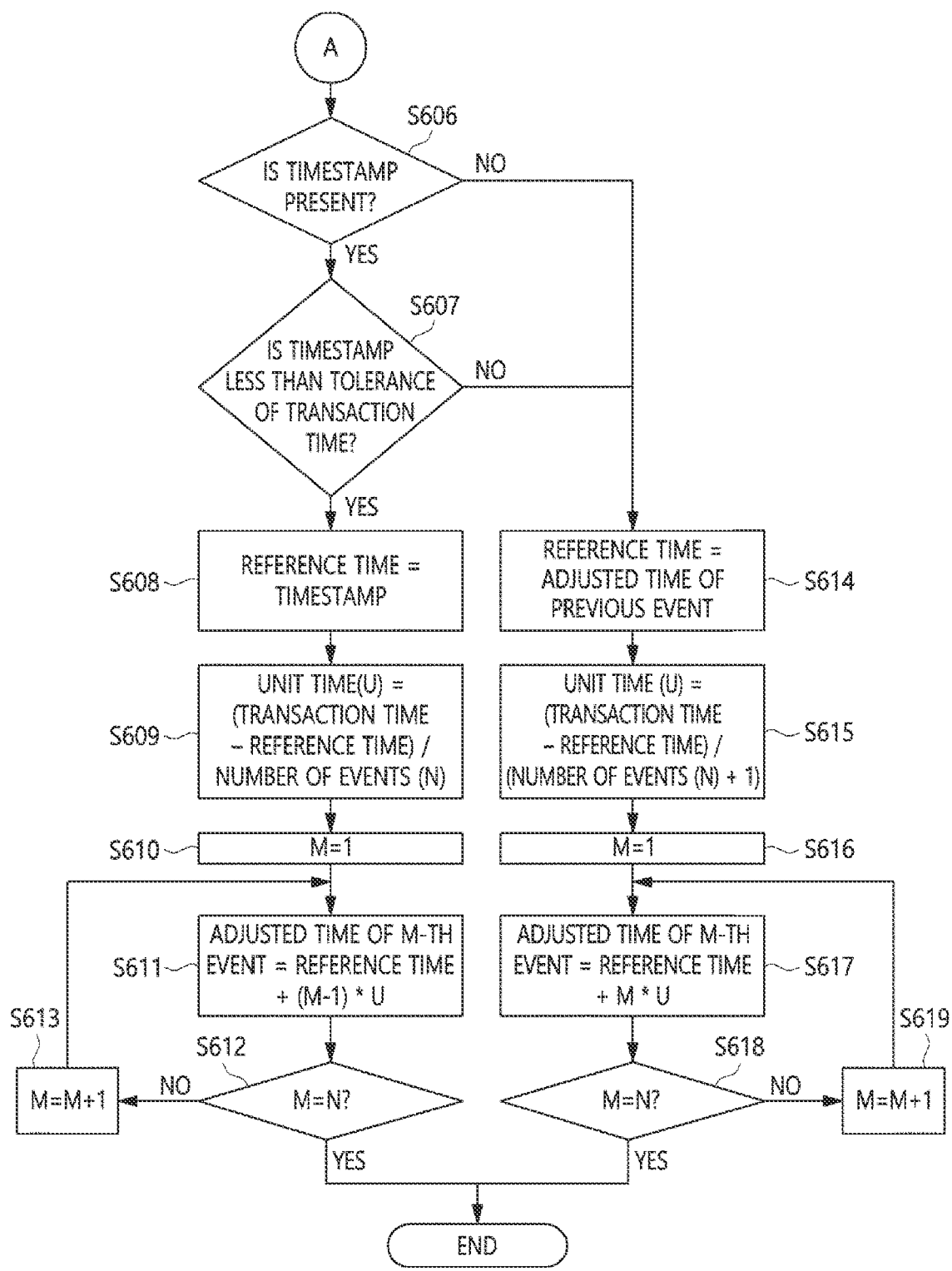

FIG. 11 and FIG. 12 are flowcharts for explaining step S520 illustrated in FIG. 9 in detail.

Referring to FIG. 11, a consumer terminal 150 determines whether two or more sensor measurement values are included in an event record body at step S601.

When it is determined at step S601 that two or more sensor measurement values are included in the event record body, the consumer terminal 150 performs step S606 illustrated in FIG. 12.

Conversely, when it is determined at step S601 that only a single sensor measurement value is included in the event record body, the consumer terminal 150 determines whether a timestamp is included in the event record body at step S602.

When it is determined at step S602 that a timestamp is included in the event record body, the consumer terminal 150 calculates the time difference between the time recorded in the timestamp and a transaction time and determines whether the calculated time difference is less than a tolerance at step S603.

Here, the tolerance may be set in consideration of the processing rate (transactions per second) of the blockchain 120, the event sampling rate of the sensor device 110, and the like.

When it is determined at step S603 that the calculated time difference is less than the tolerance, the consumer terminal 150 sets an adjusted event time to the time recorded in the timestamp at step S604.

For example, referring to FIG. 10, the time at which event 1 actually occurred is $E_1$. Here, only when the time difference $\Delta t_1$ between the timestamp $ts_1$ corresponding to event 1 and the transaction time $T_1$ corresponding thereto is less than the tolerance is $ts_1$ selected as the adjusted time AT of event 1. This may be represented as shown in the following Equation (1):

$$\Delta t_n = T_n - ts_n \text{ (where } T_n > ts_n)$$

$$\Delta T(E_n) = ts_n \text{ (if } \Delta t_n < \text{tolerance)} \quad (1)$$

Conversely, when it is determined at step S603 that the calculated time difference is equal to or greater than the tolerance, the consumer terminal 150 sets the transaction time as the adjusted event time at step S605.

For example, referring to FIG. 10, the time at which event 8 actually occurred is $E_8$, but the timestamp $ts_8$ of an event record is set to the time at which an error occurred due to a failure of a timer or the like. This may degrade the reliability of all stream data. In order to prevent such degradation, the adjusted time of event 8 is finally set to the transaction time $T_8$. This may be represented as shown in the following Equation (2):

$$\Delta t_n = T_n - ts_n \text{ (where } T_n > ts_n)$$

$$AT(E_n) = T_n \text{ (if } \Delta t_n > \text{tolerance)} \quad (2)$$

Meanwhile, when it is determined at step S602 that no timestamp is included in the event record body, the consumer terminal 150 may set the transaction time as the adjusted event time at step S605.

For example, referring to FIG. 10, in the case of event 4, there is no time information to refer to, except the transaction time $T_4$, so the transaction time $T_4$ is set as the adjusted event time. This may be represented as shown in the following Equation (3):

$$AT(E_n)=T_n \text{ (if (one measurement)\&\&}(ts_n \text{ not specified))} \quad (3)$$

Meanwhile, when it is determined at step S601 that two or more sensor measurement values are included in the event record body, the consumer terminal 150 determines whether a timestamp is included in the event record body at step S606, as illustrated in FIG. 12.

When it is determined at step S606 that a timestamp is included in the event record body, the consumer terminal 150 calculates the time difference between the time recorded in the timestamp and the transaction time and determines whether the calculated time difference is less than a tolerance at step S607.

Here, the tolerance may be set in consideration of the processing rate (transactions per second) of the blockchain 120, the event sampling rate of the sensor device 110, and the like.

Additionally, the tolerance may be set in consideration of the number of events included in the event record body. For example, when the number of events is 3, the tolerance may be set to three times the tolerance used at step S603 in FIG. 11.

When it is determined at step S607 that the calculated time difference is less than the tolerance, the consumer terminal 150 sets a reference time to the time recorded in the timestamp at step S608.

Then, the consumer terminal 150 calculates the time difference between the set reference time of the event record and the transaction time of the event record body and calculates a unit time U from the calculated time difference based on the number of two or more events at step S609.

For example, referring to FIG. 10, event 2 and event 3 are included in the same event record body, and the timestamp of event 3 is omitted. In this case, the time ts2 of the timestamp of event 2 is set as the reference time.

Then, the time difference (distance) between the reference time $ts_2$ and the transaction time $T_2$ of the corresponding event record is calculated. Then, the unit time U is set to a value acquired by dividing the time difference (distance) by the number N of events. This may be represented as shown in the following Equation (4):

$$\text{distance}=T_n-ts_n \text{ (where } T_n>ts_n)$$

$$U=\text{distance}/N \quad (4)$$

Then, the consumer terminal 150 sets the adjusted time AT of each of the events based on the unit time U using an interpolation method at steps S610 to 613. For example, referring to FIG. 10, the adjusted time AT of event 2 is set to the reference time $ts_2$, and the time of event 3 is set to the time acquired by adding the unit time U to $ts_2$. This may be represented as shown in the following Equation (5), where M (M being an integer equal to or less than N) denotes the sequence number of each of the N events included in the event record body.

$$AT(E_{n+(M-1)})=ts_n+U*(M-1) \quad (5)$$

Also, when it is determined at step S606 that no timestamp is included in the event record body or when it is determined at step S607 that the calculated time difference is equal to or greater than the tolerance, the consumer terminal 150 sets the reference time to the transaction time of the previous event record body at step S614.

Then, the consumer terminal 150 calculates the time difference between the set reference time and the transaction time of the event record body and calculates the unit time U from the calculated time difference based on the number N of two or more events at step S615.

For example, referring to FIG. 10, when multiple events, the time stamps of which are omitted, such as event 5, event 6, and event 7, are included in a single event record body, because there is no timestamp, the time difference between the adjusted time $T_4$ of the previous event and the transaction time $T_5$ of the current event record is calculated. Then, the unit time U is set to a value acquired by dividing the time difference (distance) by the sum of the number of events N and "1" (that is, N+1). This may be represented as shown in the following Equation (6):

$$\text{distance}=AT(E_{n-1})-T_n \text{ (where } T_n>T_{n-1})$$

$$U=\text{distance}/(N+1) \quad (6)$$

Then, the consumer terminal 150 sets the adjusted time AT of each of the events based on the unit time U using an interpolation method at steps S616 to 619.

That is, referring to FIG. 10, the adjusted time $AT(E_5)$ of event 5 is set to the time acquired by adding the unit time U to the adjusted time $AT(E_4)$ of event 4. This may be represented as shown in the following Equation (7), where M (M being an integer equal to or less than N) denotes the sequence number of each of the N events included in the event record body.

$$AT(E_{n+(M-1)}) = AT(E_{n-1}) + U*M \quad (7)$$

When the event time is adjusted for each of the events illustrated in FIG. as described above, the resultant adjusted time may be represented as shown in the following Table 1.

TABLE 1

| event | record timestamp | transaction time | interpolation section | adjusted time |
|---|---|---|---|---|
| E1 | ts1 | T1 | — | ts1 |
| E2 | ts2 | T2 | — | ts2 |
| E3 | N/A | T2 | [ts2, T2] | ts2 + (T2 − ts2)/2 |
| E4 | N/A | T4 | — | T4 |
| E5 | N/A | T4, T5 | [T4, T5] | T4 + (T5 − T4)/4 |
| E6 | N/A | T4, T5 | [T4, T5] | T4 + 2*(T5 − T4)/4 |
| E7 | N/A | T4, T5 | [T4, T5] | T4 + 3*(T5 − T4)/4 |
| E8 | ts8 | T8 | — | T8 |

Through the above-described adjustment operation, the consumer terminal 150 may securely recover stream data from distortion arising from omission of time information or malfunction of a timer of the sensor device 110.

Figure 13:
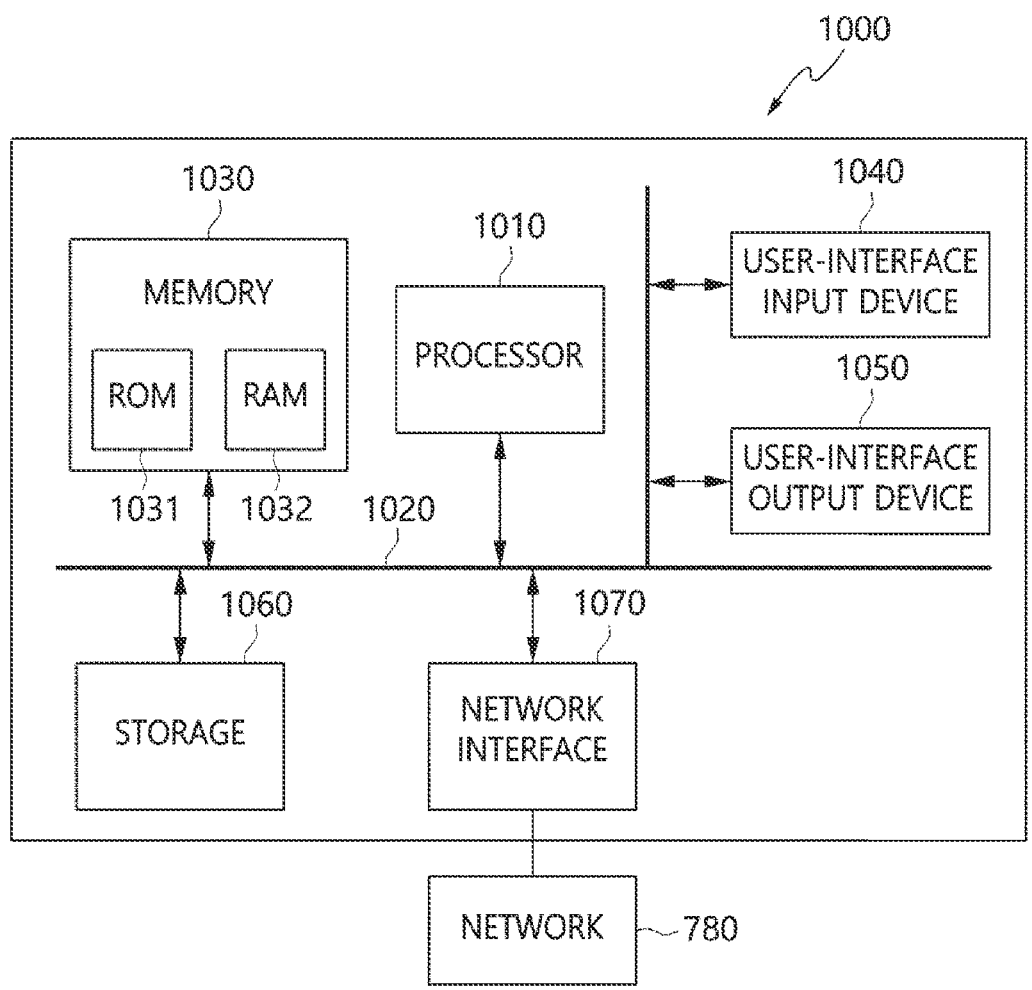
FIG. 13 is a view illustrating a computer system configuration according to an embodiment.

FIG. 13 is a view illustrating a computer system configuration according to an embodiment.

The sensor device 110, the owner server 130, and the consumer terminal 150 according to an embodiment may be implemented in a computer system 1100 including a computer-readable recording medium.

The computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing a program or processing instructions stored in the memory 1130 or the storage 1160. The memory 1130 and the storage 1160 may be storage media including at least one of a volatile medium, a nonvolatile medium, a detachable medium, a non-detachable medium, a communication medium, and an information delivery medium. For example, the memory 1130 may include ROM 1131 or RAM 1132.

According to an embodiment, the reliability of data may be verified based on the data itself using a blockchain, regardless of the server for providing IoT sensor data or the distribution route thereof. Accordingly, through the embodiment, data-based IoT infrastructure that secures the reliability of data based on the data itself may be constructed, regardless of a distribution route in the form of a cloud or P2P.

According to an embodiment, when data is traded, the owner of a sensor device provides ownership and a purchaser verifies ownership included in the data, whereby a secure data transaction may be realized. Through the embodiment, a self-verifiable record includes information about the ownership of an IoT sensor device, whereby both a data transaction model and a data-sharing model may be supported.

According to an embodiment, when pieces of sensor information in the form of individual events are collected and reproduced as stream data, time information is corrected for accurate analysis. According to an embodiment, the accuracy and reliability of stream data, which is a set of real-time events that is used for visualization, analytics and machine learning at a data consumption stage, may be improved.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for providing sensor data in a sensor device based on a blockchain, comprising:
    creating a device record using encrypted identification information of the sensor device;
    registering the device record in the blockchain;
    creating an event record using event information collected from a sensor;
    registering a header of the event record, including information about a link to the device record, in the blockchain; and
    distributing a body of the event record without the body of the event record being entered into the blockchain, the body being linked to the header of the event record,
    wherein the header of the event record includes a record body link in which a hash value of the body of the event record is recorded,
    wherein the record body link acts as a pointer that points to the body of the corresponding event record which is registered in an owner server or a distributed data repository,
    wherein each of the owner server or the distributed data repository provides the body of the event record to a consumer terminal, and
    wherein the consumer terminal verifies the body of the event record by acquiring the header of the event record, corresponding to the body of the event record, from the blockchain.

2. The method of claim 1, wherein the device record includes a device public key, a device identifier, a record signature, and an owner public key acquired from an owner server.

3. The method of claim 2, wherein the header of the event record further includes a sequence number, which indicates an event occurrence sequence, a previous record link in which a hash value of the device record or a hash value of a header of a previous event record is recorded.

4. The method of claim 3, wherein the body of the event record includes a measurement value collected from the sensor and a timestamp in which an internal timer time at a moment when the measurement value is inserted into the body of the event record is recorded, and
    the consumer terminal, which creates stream data by collecting multiple event records, acquires a timestamp recorded in the verified body of the event record and a transaction time at which the header of the event record is registered in the blockchain and sets an adjusted event time based on the acquired timestamp and transaction time.

5. The method of claim 1, wherein the blockchain stores a record chain root which is a pointer that points to the header of the event record that is most recently added, and is retrieved in order to check the most recent event.

6. The method of claim 3, wherein, with regard to the device record registered in the blockchain, owner information and the device identifier are verified by way of the owner server.

7. The method of claim 1, wherein:
    distributing the body of the event record is configured to register the body of the event record in an owner server, and
    the owner server provides the body of the event record to a consumer terminal based on authentication of a consumer.

8. The method of claim 1, wherein:
    distributing the body of the event record is configured to register the body of the event record in a distributed data repository, and
    the distributed data repository provides the body of the event record in response to a request from a consumer terminal.

9. A method for adjusting an event time in a consumer terminal, comprising:
    acquiring a transaction time at which an event record header of an event record is registered in a blockchain;
    acquiring a timestamp included in a verified event record body of the event record, wherein the event record body is not entered into the blockchain; and
    setting an adjusted event time in the consumer terminal based on the acquired timestamp and transaction time,
    wherein the header of the event record includes a record body link in which a hash value of the body of the event record is recorded,
    wherein the record body link acts as a pointer that points to the body of the corresponding event record which is registered in an owner server or a distributed data repository, wherein each of the owner server or the distributed data repository provides the body of the event record to a consumer terminal, and wherein the consumer terminal verifies the body of the event record by acquiring the header of the event record, corresponding to the body of the event record, from the blockchain.

10. The method of claim 9, wherein setting the adjusted event time comprises:
calculating a time difference between a time recorded in the timestamp and the transaction time; and
setting one of the time recorded in the timestamp and the transaction time as the adjusted event time depending on whether the calculated time difference is less than a tolerance.

11. The method of claim 9, wherein setting the adjusted event time is configured to set the transaction time as the adjusted event time of an event when there is no timestamp in the event record body.

12. The method of claim 9, wherein setting the adjusted event time is configured to:
set a reference time to one of the timestamp included in the event record body and a transaction time of a previous event record body when two or more events are recorded in the event record body, and
calculate a unit time from a time difference between the set reference time and the transaction time of the event record body based on a number of two or more events and set a time of each of the events by performing interpolation based on the unit time.

13. A sensor device, comprising:
memory in which at least one program is recorded; and
a processor for executing the program,
wherein the program performs:
creating a device record using encrypted device identification information,
registering the device record in a blockchain,
creating an event record using event information collected from a sensor,
registering a header of the event record, including information about a link to the device record, in the blockchain, and
distributing a body of the event record without the body of the event record being entered into the blockchain, the body being linked to the header of the event record,
wherein the header of the event record includes a record body link in which a hash value of the body of the event record is recorded, wherein the record body link acts as a pointer that points to the body of the corresponding event record which is registered in an owner server or a distributed data repository, wherein each of the owner server or the distributed data repository provides the body of the event record to a consumer terminal, and wherein the consumer terminal verifies the body of the event record by acquiring the header of the event record, corresponding to the body of the event record, from the blockchain.

14. The sensor device of claim 13, wherein the device record includes a device public key, a device identifier, a record signature, and an owner public key acquired from an owner server.

15. The sensor device of claim 14, wherein the header of the event record includes a sequence number, which indicates an event occurrence sequence, a previous record link in which a hash value of the device record or a hash value of a header of a previous event record is recorded.

16. The sensor device of claim 15, wherein the body of the event record includes a measurement value collected from the sensor and a timestamp in which an internal timer time at a moment when the measurement value is inserted into the body of the event record is recorded.

17. The sensor device of claim 13, wherein the blockchain stores a record chain root which is a pointer that points to the header of the event record that is most recently added, and is retrieved in order to check the most recent event.

18. The sensor device of claim 13, wherein:
distributing the body of the event record is configured to register the body of the event record in an owner server, and
the owner server provides the body of the event record to a consumer terminal based on authentication of a consumer.

19. The sensor device of claim 13, wherein:
distributing the body of the event record is configured to register the body of the event record in a distributed data repository, and
the distributed data repository provides the body of the event record in response to a request from a consumer terminal.

20. The sensor device of one of claim 18, wherein the consumer terminal, which creates stream data by collecting multiple event records, acquires a timestamp recorded in the verified body of the event record and a transaction time at which the header of the event record is registered in the blockchain and sets an adjusted event time based on the acquired timestamp and transaction time.

* * * * *